United States Patent Office 3,030,309
Patented Apr. 17, 1962

3,030,309
FIRE RESISTANT HYDRAULIC FLUID
Walter J. Coppock, Wallingford, Pa., assignor to Sun Oil Company, Philadelphia, Pa., a corporation of New Jersey
No Drawing. Filed Dec. 23, 1957, Ser. No. 704,317
5 Claims. (Cl. 252—79)

This invention relates to a fire resistant hydraulic fluid comprising an emulsion of water in petroleum lubricating oil.

Fire resistant hydraulic fluids are having increasing use in various industrial and other applications. The type of fluid which constitutes an emulsion of water in a petroleum fraction has important advantages, but problems frequently arise with respect to insufficient stability of the emulsion, particularly at extremes of temperature to which the emulsion may be subjected.

The unsatisfactory stability in hydrocarbon-water emulsion hydraulic fluids is attributable to deficiencies in the emulsifying agents previously employed. Numerous surface active agents have been tried and found unsuitable, giving the impression that the stability needed in at least some uses of hydraulic fluids was unobtainable. The present invention provides however a fire resistant hydraulic fluid comprising an emulsion of water in petroleum lubricating oil, which emulsion is remarkably stable even at extremes of temperature, and from which water does not separate even under quite severe conditions of use of fire resistant hydraulic fluids. This result is obtained by employing two ester emulsifying agents in combination, one of which is a relatively hydrophobic partial ester of glycerol (hereinafter referred to as the glycerol ester), and the other a relatively hydrophilic polyalkoxylated partial ester of a polyhydric alcohol (hereinafter referred to as the polyalkoxylated ester). It has been found that this emulsifier combination provides satisfactory results under conditions at which many other emulsifiers and emulsifier combinations do not.

The hydraulic fluid according to the present invention has the following composition:

| | |
|---|---|
| Petroleum lubricating oil | Not more than 79 volume percent. |
| Water | At least 20 volume percent. |
| Glycerol ester | 0.5 to 5.0%. |
| Polyalkoxylated ester | 0.5 to 5.0%. |

The lubricating oil is the continuous phase in the emulsion and the water is the disperse phase. The lower limit of lubricating oil concentration and the upper limit of water concentration are determined by the composition, readily determined by the person skilled in the art, at which inversion of phases would occur to produce an oil-in-water emulsion.

Preferred compositions according to the invention are the following:

| | |
|---|---|
| Petroleum lubricating oil | 55 to 73.5 vol. percent. |
| Water | 25 to 43.5 vol. percent. |
| Glycerol ester | 0.75 to 2.0 percent. |
| Polyalkoxylated ester | 0.75 to 2.0 percent. |

The relatively hydrophobic ester which is employed according to the invention is a partial ester of glycerol. Examples of suitable esters are glycerol monooleate, glycerol monostearate, glycerol dipalmitate, glycerol monorosinate, glycerol mononaphthenate, etc. A preferred ester is glycerol monooleate.

The relatively hydrophilic ester which is employed according to the invention is a polyalkoxylated partial ester of a polyhydric alcohol, which ester has, prior to alkoxylation, 2 to 5 free hydroxyls per molecule. Examples of suitable esters for alkoxylation include glycerol monooleate, sorbitan monooleate, sorbitan sesquioleate, pentaerythritol monostearate, 1,5-pentanediol dipalmitate, mannitan trinaphthenate, sorbitan monorosinate, etc. The alkoxylation can be performed in any suitable known manner such as contacting the partial ester with an alkylene oxide, e.g. ethylene oxide, propylene oxide-1,2, etc., to react the alkylene oxide with hydroxyl structure in the partial ester. Preferably the number of moles of alkylene oxide reacted per mole of partial ester is within the approximate range from 4 to 24 in order to impart the desired hydrophilic character to the ester. The formation of relatively hydrophilic compounds by alkoxylation of partial esters of polyhydric alcohols is known in the art, and any suitable known procedure can be employed.

Examples of polyalkoxylated esters suitable for use according to the invention are polyoxyethylene sorbitan monolaurate, an oily liquid having viscosity of 350 to 550 cp. at 25° C., and specific gravity of 1.05 to 1.10 (Atlas Powder Company's "Tween 21"), polyoxyethylene sorbitan monostearate, a waxy solid having specific gravity of 1.04 to 1.08 (Atlas' "Tween 61"), polyoxyethylene sorbitan tristearate, a waxy solid having specific gravity of 1.03 to 1.08 (Atlas' "Tween 65"), polyoxyethylene sorbitan monooleate, an oily liquid having viscosity of 350 to 550 cp. at 25° C., and specific gravity of 1.00 to 1.05 (Atlas' "Tween 81"), polyoxyethylene sorbitan trioleate, an oily liquid having viscosity of 200 to 400 cp. at 25° C., and specific gravity of 1.00 to 1.05 (Atlas' "Tween 85"), polyoxyethylene propylene glycol monostearate, a semi-solid having specific gravity of 1.05 to 1.10 (Atlas' "G–2162"), etc.

Any suitable organic monocarboxylic acid can be employed in the preparation of the ester additives. Thus, the acid can be an aromatic, aliphatic, cycloaliphatic or heterocyclic carboxylic acid. Preferred acids are: the naturally occurring fatty acids, more preferably those having 12 to 30 carbon atoms per molecule, e.g. lauric, myristic, palmitic, oleic, stearic, erucic acids, etc.; petroleum naphthenic acids; rosin acids; and mixtures of carboxylic acids obtained by the partial oxidation of liquid phase of hydrocarbon mixtures such as petroleum fractions, as disclosed for example in L. W. Jones United States Patent No. 2,756,211, issued July 24, 1956, and the disclosures referred to in the specification of that patent. Other types of acids can be employed to make the ester additive, e.g. benzoic acid, furoic acid, etc. However, the acids previously mentioned are preferred. The acids preferably have 16 to 22 carbon atoms per molecule.

It is essential according to the invention that both esters as above described be employed. Otherwise separation of excessive amounts of oil or "cream" from the emulsion tends to be obtained even under room temperature conditions. The separation of cream from an emulsion hydraulic fluid is a phenomenon wherein an upper layer of emulsion separates from the lower body of the emulsion. The upper emulsion, which is called "cream," is presumably lower in water content than the lower emulsion. The ratio of esters in the composition is preferably within the range from 0.1 to 10, more preferably 0.5 to 2.0, parts per weight of polyalkoxylated ester per part of glycerol ester.

The lubricating oil employed in the composition according to the invention preferably has Saybolt Universal viscosity within the approximate range from 50 to 500 seconds at 100° F., though other oils can be used in some instances. The oil may be obtained from any suitable type of crude petroleum, e.g. paraffinic, naphthenic, paraffinic-naphthenic crude, by conventional distillation and refining procedures.

If desired an additive can be employed in the composition to improve the load carrying properties. Any suitable additive capable of providing this result can be employed, e.g. triaryl phosphates.

Any suitable polyhydric alcohol having two or more hydroxyl groups per molecule, can be employed in the preparation of the polyalkoxylated ester additive according to the invention. Examples of suitable ester-forming polyhydric alcohols are glycols such as ethylene glycol, propylene glycol, butylene glycol, 1,5-pentandiol, 1,6-hexanediol, diethylene glycol, triethylene glycol and higher analogs; glycerol; pentaerythritol; sorbitol; sorbitan-1,4; mannitol; etc. Sorbitan-1,4 is preferred. For further disclosure of polyhydric alcohols, reference is made to R. E. Kirk et al., "Encyclopedia of Chemical Technology," volume 1 (1947), page 308, Tables II and III, and pages 321 to 333.

The following examples illustrate the invention:

Example I

The following composition is prepared:

| | Percent |
|---|---|
| Naphthenic distillate lubricating oil (100 SUS at 100° F.) | 54.4 |
| Glycerol monooleate (Emery Industries' "Emery 2221") | 1.2 |
| Polyoxyethylene sorbitan trioleate (Atlas' "Tween 85") | 1.2 |
| Tricresyl phosphate | 1.2 |
| Water | 40 |

The composition has A.P.I. gravity at 60° F. of 15.8, Saybolt Universal viscosity of 450 seconds at 100° F. and 75 seconds at 210° F., pH of 8.0, pour point of 0° F. The invention passes ASTM D665-A rusting test and passes the Falex load carrying test at 1000 pounds. The composition has good stability under normal storage conditions and does not separate any water at room temperature or at 100° F. over a two month period. The composition performs well from the standpoint of not causing excessive wear of metal parts of pumps and other equipment with which it comes in contact during use. In the high temperature spray test and the hot manifold test at 1300° F. for fire resistance (both set forth in Military Specification MIL-F-7100 "Fluid, Hydraulic, Non-flammable Aircraft"), the composition does not flash nor sustain fire.

Example II

In order to show the necessity for both emulsifying agents in the compositions according to the invention, tests were made wherein the emulsion was allowed to stand at room temperature for seven days and observed at the end of that period to determine the amount of oil which separated as an upper layer and the amount of cream if any which separated as a layer between the oil and emulsion layers. The figures given are volume percents:

| Emulsifying Agent | Oil | Cream |
|---|---|---|
| Polyalkoxylated ester only—4% | 32 | 0 |
| Glycerol ester only—4% | 2 | 23 |
| Both esters—2% each | 1 | 0 |

This example shows the necessity of employing both esters in order to eliminate excessive oil or cream separation upon standing.

The good stability obtained with a glycerol ester and a polyalkoxylated ester is not obtained using an emulsifier such as sorbitan monopalmitate, which has relative affinity for oil and water intermediate between those of the glycerol ester and the polyalkoxylated ester. Water separation and other undesirable effects were obtained in a fluid similar to the above, but using 4% of sorbitan monopalmitate as sole emulsifier.

Example III

A hydraulic fluid according to the invention was compared with a commercial hydaulic fluid comprising an emulsion of water and oil containing about 40% water and having the following properties: A.P.I. gravity at 60° F. of 19.6; pour point 0° F., organic $SO_3$ content 0.17%, Saybolt Universal viscosity at 100° F. of 444 seconds. This commercial fluid is believed to contain a sulfonated fatty oil as emulsifying agent.

Tests were made in which the respective fluids were allowed to stand at room temperature for three months. In the case of the fluid according to the invention, 71 volume percent of the emulsion remained as lower emulsion at the end of the three month period, only 25% having formed an upper cream layer and only 4% having formed an oil layer. The commercial hydraulic fluid contained only 30% emulsion at the end of the three month period, 55% having separated into an oil layer and 15% into a water layer. There was no separation of a water layer in the case of the fluid according to the invention.

Other tests were made in which the respective fluids were allowed to stand at 110° F. for 3 months. The fluid according to the invention contained 60% emulsion at the end of three months, 40% having separated as an oil layer. The commercial fluid had completely separated into its respective oil and water components by the end of the three month period, and none of the original emulsion remained.

Other tests were made in which a freeze-thaw cycle was performed on the respective fluids. The freeze-thaw cycle involves cooling overnight to about 0° F. in a room maintained at that temperature, then allowing the fluid to rise again gradually to room temperature. In the case of the fluid according to the invention, there was no water separation at any time during the cycle. In the case of the commercial fluid, 35% of the emulsion had separated as a water layer by the end of the cycle, indicating that only a very small proportion of the original water remained in the emulsion.

Generally similar results to those obtained above are obtained using other glycerol esters and polyalkoxylated esters such as those disclosed previously.

The use of glycerol esters as the hydrophobic esters in the compositions according to the invention is essential in order to obtain the remarkable stability which characterizes those compositions. Use of sorbitan monooleate, for example, in place of glycerol monooleate in Example II, results in inferior stability at constant temperature conditions and also in complete resolution of the emulsion in the freeze-thaw cycle.

The invention claimed is:

1. A fire resistant hydraulic fluid consisting essentially of an emulsion of a metal-free water phase in a petroleum lubricating oil phase, the amount of water being at least 20 volume percent of the hydraulic fluid, and containing as emulsifying agents (1) a partial ester of glycerol with organic monocarboxylic acid and (2) a polyalkoxylated partial ester of a polyhydric alcohol with organic monocarboxylic acid, each of the esters being present in 0.5 to 5.0 volume percent concentration, and ester (2) being more hydrophilic than ester (1).

2. The fire resistant hydraulic fluid of claim 1 wherein the first-named ester is glycerol monooleate, and the second-named ester is a polyoxyethylene sorbitan trioleate.

3. The fire resistant hydraulic fluid of claim 1 wherein the first-named ester is an ester of a carboxylic acid having 12 to 30 carbon atoms per molecule, and the second-named ester is a reaction product of an ester of a carboxylic acid having 12 to 30 carbon atoms with 4 to 24 moles of alkylene oxide per mole of ester.

4. The fire resistant hydraulic fluid of claim 1 wherein said amount of water is in the range from 25 to 43.5 volume percent of said fluid.

5. The fire resistant hydraulic fluid of claim 1 containing a minor amount of a triaryl phosphate as an additive to improve load carrying properties.

References Cited in the file of this patent

UNITED STATES PATENTS

| | | |
|---|---|---|
| 2,402,373 | Cordero | June 18, 1946 |
| 2,521,402 | Osborn | Sept. 5, 1950 |
| 2,661,344 | Lummus | Feb. 11, 1952 |
| 2,632,734 | Nunn | Mar. 24, 1953 |
| 2,744,870 | Stillebroer | May 8, 1956 |
| 2,894,910 | Francis | July 14, 1959 |

FOREIGN PATENTS

| | | |
|---|---|---|
| 509,430 | Belgium | Mar. 15, 1952 |
| 709,733 | Great Britain | June 2, 1954 |

OTHER REFERENCES

Atlas "Surface Active Agents," Atlas Powder Co., Wilmington, Del., May 15, 1949, pp. 37–42.